(12) United States Patent
Suzuki

(10) Patent No.: US 7,058,280 B2
(45) Date of Patent: Jun. 6, 2006

(54) REPRODUCING APPARATUS HAVING HIGH-SPEED REPRODUCING FUNCTION

(75) Inventor: Toshihiko Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1182 days.

(21) Appl. No.: 09/875,683

(22) Filed: Jun. 6, 2001

(65) Prior Publication Data

US 2001/0051036 A1    Dec. 13, 2001

(30) Foreign Application Priority Data

Jun. 9, 2000    (JP) .............................. 2000-173490

(51) Int. Cl.
    *H04N 5/91*    (2006.01)
(52) U.S. Cl. .......................................... 386/68; 386/82
(58) Field of Classification Search .................... 386/5, 386/6, 68, 82
    See application file for complete search history.

(56) References Cited

U.S. PATENT DOCUMENTS

| | | | | |
|---|---|---|---|---|
| 5,956,454 A | * | 9/1999 | Shinohara et al. | ............ 386/68 |
| 6,009,236 A | * | 12/1999 | Mishima et al. | ............ 386/111 |
| 6,396,999 B1 | * | 5/2002 | Van Gestel | .................. 386/68 |
| 6,400,763 B1 | * | 6/2002 | Wee | ............................. 386/68 |
| 6,631,240 B1 | * | 10/2003 | Salesin et al. | ................ 386/68 |
| 6,714,721 B1 | * | 3/2004 | Lin et al. | ....................... 386/68 |
| 6,985,670 B1 | * | 1/2006 | Saeki | ........................... 386/68 |

* cited by examiner

*Primary Examiner*—James J. Groody
*Assistant Examiner*—James A. Fletcher
(74) *Attorney, Agent, or Firm*—Cowan, Liebowitz & Latman, P.C.

(57) ABSTRACT

In a reproducing apparatus, a plurality of pictures of image data reproduced from a recording medium at a speed higher than a normal reproduction speed is stored in a memory, each of the plurality of pictures of image data stored in the memory is divided into a plurality of regions, and one picture of image data is formed by using the different divided regions of the plurality of pictures of image data.

23 Claims, 7 Drawing Sheets

MEMORY INPUT (FRAME IMAGE)

MEMORY OUTPUT (FRAME IMAGE)

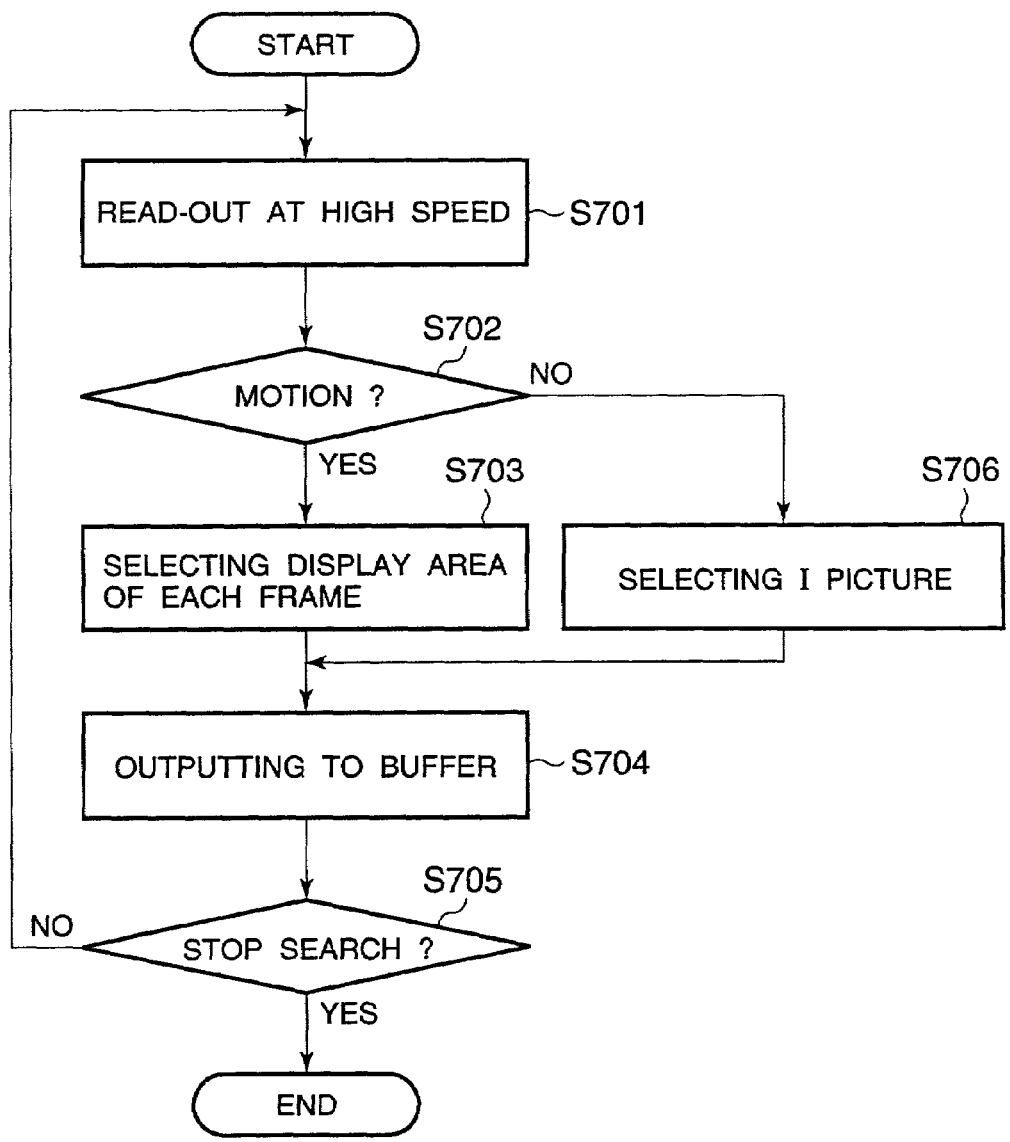

REPRODUCING APPARATUS HAVING HIGH-SPEED REPRODUCING FUNCTION

BACKGROUND OF THE INVENTION

1. Field of the Invention

The present invention relates to a reproducing apparatus and, more particularly, to processing of image data when the image data is reproduced at a high rate.

2. Related Background Art

This type of apparatuses for recording moving image data in a digital form on a recording medium such as a tape or a disk are known.

In recent years, particularly, significant progress has been made in increasing the storage capacity of disk mediums, and apparatuses have been proposed which perform long-time recording and reproducing of video signals as well as audio signals on and from a disk medium. For example, techniques using recording formats based on high-efficiency coding systems proposed by the Moving Picture Experts Group (MPEG), etc., are being studied to realize a picture recording/reproducing apparatus for one hour or longer at a data rate of about 4 to 10 Mbps. Further, there is also a positive trend in the development of disk mediums per se toward smaller disk mediums having larger capacities. The development of apparatuses capable of recording and reproduction at higher densities is being advanced.

In apparatuses for performing recording and reproduction on and from a disk medium, a search (special reproduction) may also be performed for the purpose of identifying the contents of a recording on the recording medium, as in conventional video tape recorders. To search moving image data recorded on a disk medium, the data is reproduced by determining an amount of feed of tracks on the recording medium according to a set reproduction speed (set by a user, for example) and the user checks reproduced images through a television monitor, an liquid crystal display monitor, or the like. The reproduction speed during search reproduction is determined by this track feed amount.

Such a search reproduction function conceived in the conventional art, however, is to update displayed images on frame basis at time intervals according to its reproduction speed and therefore entails a drawback in that the movements of the search reproduction images are intermittent and lack smoothness when a scene is changed and when a scene has large movement. Thus, there has been the problem in that checking of image contents during search reproduction requires a great deal of user's continuous attention to displayed images changing rapidly on a frame basis, and that images reproduced to be checked is of considerably inferior quality because of their lack of smoothness in motion and their discontinuous and fragmentary condition.

SUMMARY OF THE INVENTION

In view of the above-described circumstances, an object of the present invention is to provide a reproducing apparatus capable of obtaining a reproducing image having a smooth movement even at the time of high-speed reproduction.

To achieve this object, according to an aspect of the present invention, there is provided a reproducing apparatus comprising reproducing means for reproducing image data from a recording medium at a speed higher than a normal reproduction speed, storage means for storing a plurality of pictures of image data reproduced by the reproducing means, and forming means for dividing each of a plurality of pictures of image data stored in the storage means into a plurality of regions and for forming one picture of high-speed-reproduction image data by using the different divided regions of the plurality of pidtures of image data.

These and other objects and features of the present invention will become more apparent from the detailed description of embodiments of the invention with reference to the accompanying drawings.

BRIEF DESCRIPTION OF THE DRAWINGS

FIG. 7 is a flowchart for explaining another search reproduction operation in the embodiment of the present invention.

DETAILED DESCRIPTION OF THE PREFERRED EMBODIMENTS

Embodiments of the present invention will be described with reference to the accompanying drawings.

Figure 1:
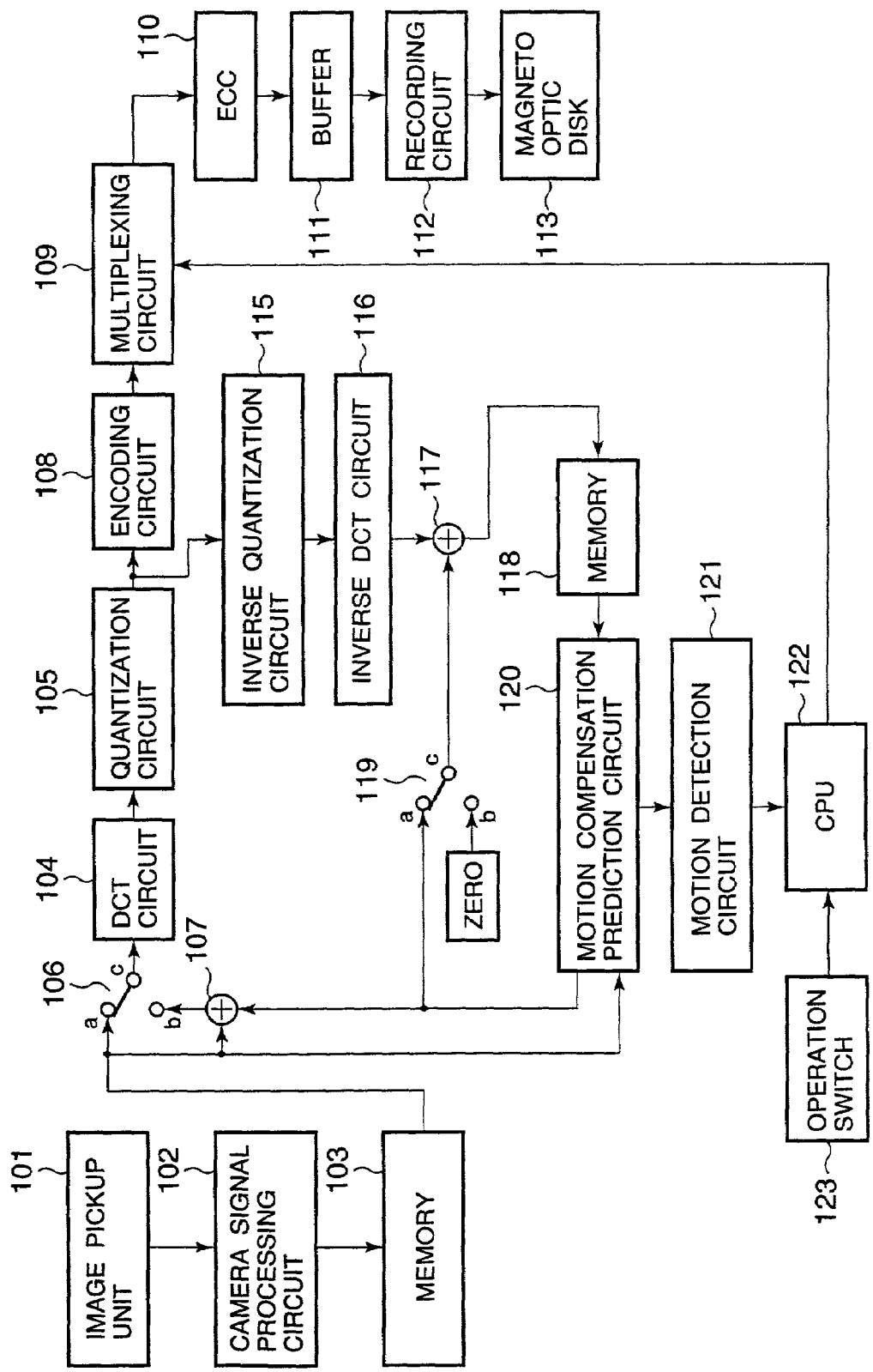
FIG. 1 is a diagram showing the configuration of a recording system of a recording and reproducing apparatus to which the present invention is applied.
Figure 2:
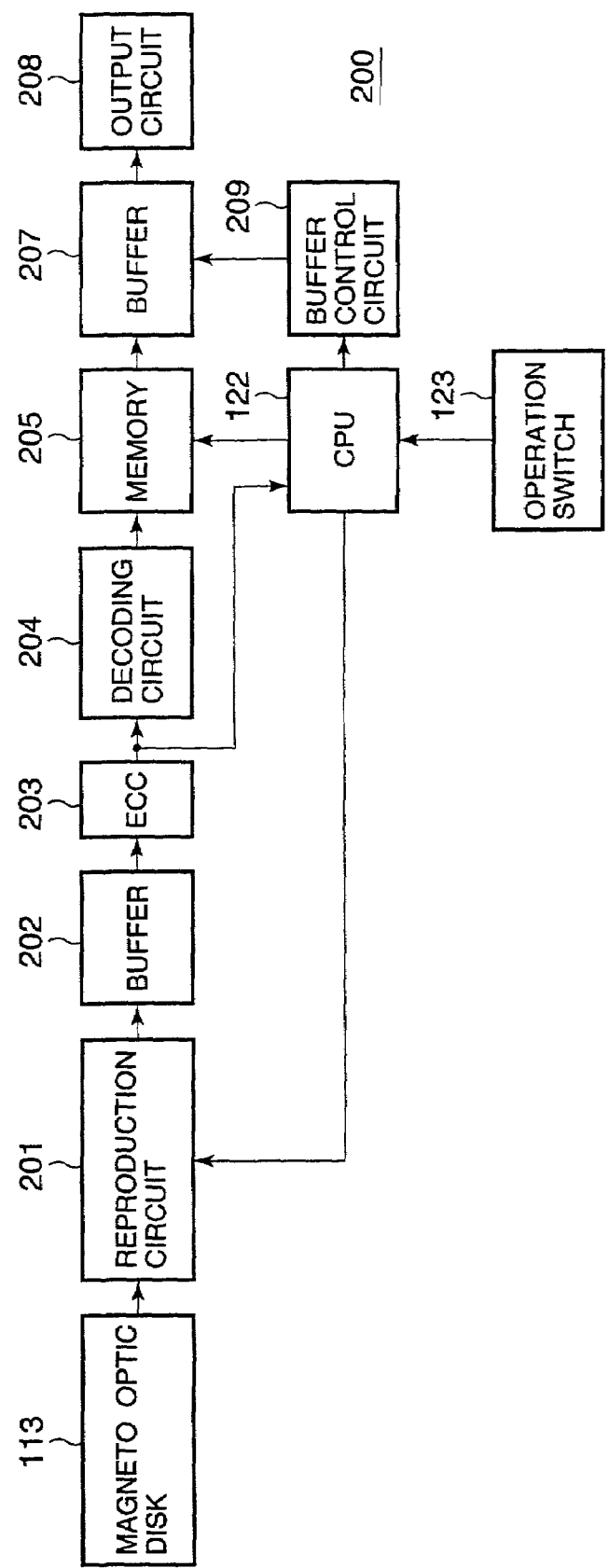
FIG. 2 is a diagram showing the configuration of a reproducing system of the recording and reproducing apparatus to which the present invention is applied.

FIG. 1 is a block diagram showing the configuration of a recording system 100 of a recording and reproducing apparatus to which the present invention is applied, and FIG. 2 is a block diagram showing the configuration of a reproducing system 200 of the apparatus.

The recording operation of the apparatus showing in FIG. 1 will first be described.

Referring to FIG. 1, image data obtained by an image pickup unit 101 is converted into a digital signal by a camera signal processing circuit 102, and the converted signal undergoes various kinds of signal processing such as gain adjustment, color separation, gradation correction, white balancing, etc.

The image signal thus obtained is temporarily stored in a memory 103. In this embodiment, frames of image data are each separated into three kinds of pictures: "intra picture (I-picture)", "predictive picture (P-picture)", and "bidirectionally predictive picture (B-picture)" according to the modes in which they are coded. These pictures are each arranged in such a manner that one I-picture is placed as a leading picture, P-pictures are each placed as every third frame after the I-picture, and two frames of B-pictures are placed before and after each P-picture, and thus form a group of pictures (GOP) composed of a total of 15 frames. The pictures thus arranged are rearranged by changing the order in which the pictures are each output from the memory 103. The GOP is a basic unit used in coding in accordance with an MPEG system.

This rearrangement will be explained below with reference to FIG. 3.

Coding in this embodiment, for example, interframe coding is performed by arranging P-frames as every third frame after one I-frame of intra-frame and interposing two B frames between the I- and P-frames.

Figure 3:
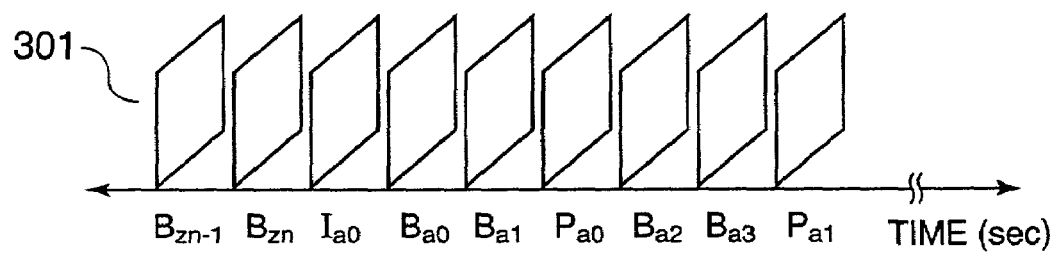
FIG. 3 is a diagram for explaining coding processing in the apparatus shown in FIG. 1.
Figure 3:
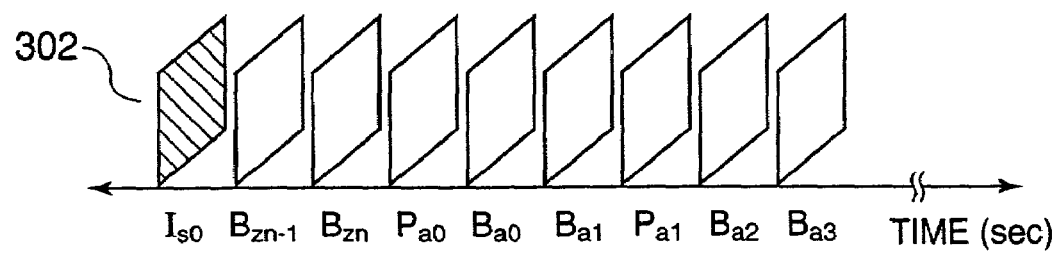

If an image input to the memory 103 has frames Bzn−1, Bzn, Ia0, Ba0, Ba1, Ba2, Pa0, Ba2, Ba3, Pa1 . . . as represented by a group of frames 301 in FIG. 3, and if the frames are processed in the input order to be coded into B-, B-, I-, B-, B-, P-, B-, B-, P- . . . frames, the memory 103 outputs image data in the order of Ia0, Bzn−1, Bzn, Pa0, Ba0, Ba1, Pa1, Ba2, Ba3 . . . , as represented by a group of frames 302 in FIG. 3.

Image data output from the memory 103 is supplied to a terminal a of two terminals a and b of a switch 106, to a subtracter 107 and to a motion compensation prediction circuit 120.

To process image data input as shown in FIG. 3, frame Ia0 of image data from the memory 103 is first read out on a k×1 (e.g., 8×8) pixel block basis to be supplied to the terminal a of the switch 106 and to the subtracter 107.

When the image data output from the memory 103 is an I-frame, the switch 106 selects the terminal a. When the image output from the memory 103 is a P- or B-frame, the switch 106 selects the terminal b. At this stage, therefore, the switch 106 selects the terminal a to supply frame Ia0 of image data in the form of blocks to a discrete cosine transform (DCT) circuit 104.

The DCT circuit 104 converts the image data supplied from the switch 106 into data in a frequency region by DCT processing with respect to 8×8 pixel blocks, and supplies the converted data to a quantization circuit 105.

The quantization circuit 105 quantizes the image data converted into data in a frequency region by the DCT circuit 104 and supplies the quantized data to a variable length coding circuit 108 and to an inverse quantization circuit 115. The variable length coding circuit 108 encodes the quantized data supplied from the quantization circuit 105 by variable length coding such as run-length coding or the like and supplies the encoded data to a multiplexing circuit 109.

On the other hand, the inverse quantization circuit 115 inverse-quantizes the data supplied from the quantization circuit 105 and supplies the inverse-quantized data to an inverse DCT circuit 116. The inverse DCT circuit 116 processes, by inverse DCT processing, the image data supplied from the inverse quantization circuit 115 to convert the data in a frequency region into data in a two-dimensional-space region, and supplies the converted data to an addition circuit 117.

The addition circuit 117 adds data from a switch 119 to the data processed by inverse DCT and supplied from the inverse DCT circuit 116. The switch 119 selects a terminal b to supply data 0 to the addition circuit 117 when I-frame image data is output from the inverse DCT circuit 116. At this time, therefore, data having substantially the same values as that before being coded is output as decoded data from the addition circuit 117 to be supplied to a memory 118. The memory 118 stores the supplied decoded data at a predetermined address.

After the completion of coding of frame Ia0, the memory 103 reads out frames Bzn−1 and Bzn of image data in this order to process these frames. Processing of these frames is the same as processing of frames Ba0 and Ba1 and will be described in detail by the description of processing of frames Ba0 and Ba1 described below.

Next, the memory 103 reads out frame Pa0 of image data on a k×1 pixel block basis and supplies the read data to the subtracter 107 and to the motion compensation prediction circuit 120. The motion compensation prediction circuit 120 obtains a motion vector of data (block) having the least prediction error (difference) by searching frame Ia0 of image data decoded and stored in the memory 118. The motion compensation prediction circuit 120 reads out from the memory 118 the decoded data designated by the motion vector as a predicted data, supplies this data to the subtracter 107 and to the switch 119, and outputs the obtained motion vector to a motion detection circuit 121.

The subtracter 107 computes the difference between the frame Pa0 of image data supplied from the memory 103 and the predicted data read out from the memory 118 and supplied to the subtracter 107 by the motion compensation circuit 120, and supplies the computation result to the other terminal b of the switch 106. The switch 106 selects the terminal b and supplies the output from the subtracter 107 to the DCT circuit 104 when the image data supplied from the memory 103 is a P- or B-frame. The DCT circuit 104 converts the data in a spatial region from the switch 106 into data in a frequency region by DCT, and outputs the converted data to the quantization circuit 105. The quantization circuit 105 quantizes the data converted by DCT and supplied from the DCT circuit 104 and supplies the quantized data to the variable length coding circuit 108 and to the inverse quantization circuit 115.

The variable length coding circuit 108 encodes the quantized data supplied from the quantization circuit 105 by variable length coding and supplies the encoded data to the multiplexing circuit 109. The inverse quantization circuit 115 inverse-quantizes the data supplied from the quantization circuit 105 and supplies the inverse-quantized data to the inverse DCT circuit 116. The inverse DCT circuit 116 processes by inverse DCT the data supplied from the inverse quantization circuit 115 to convert the data on the frequency axis into data in a two-dimensional-space region, and supplies the converted data to the addition circuit 117.

The addition circuit 117 adds data from the switch 119 to the data processed by inverse DCT and supplied from the inverse DCT circuit 116. Here, the switch 119 is in the state of selecting the terminal a and outputs to the addition circuit 117 the data predicted from frame Ia0 and read out from the memory 118 by the motion compensation prediction circuit 120 as described above. The addition circuit 117 adds this predicted data to the data converted by inverse DCT and supplied from the inverse DCT circuit 116, and supplies the addition result as decoded data to the memory 118. The memory 118 stores at a predetermined address the decoded data supplied from the addition circuit 117.

After the completion of coding of frame Pa0 of image data, the motion detection circuit 121 obtains the total sum of the absolute values of motion vectors of one frame supplied from the motion compensation prediction circuit 120, binarizes the total sum by using a predetermined threshold value to obtain 1-bit frame motion information, and supplies this information to the CPU 122.

An operation switch 123 has an operating key for instructing start and stop of recording, and changes modes in which the apparatus operates by sending to the CPU 122 a control signal as an instruction to start or stop recording according to the operation of the operating key. The CPU 122 transmits the motion information from the motion detection circuit 121 to the multiplexing circuit 109.

The multiplexing circuit 109 multiplexes, on the variable-length-coded data supplied from the variable length coding circuit 108, the motion vectors from the motion compensation prediction circuit 120, and additional information, such as header information, motion information, and scene change information, supplied from the CPU 122.

For example, the motion information is multiplexed as additional information to form a header in each frame of coded data.

After the completion of coding of frame Pa0, the memory 103 next reads out frame Ba0 and the same processing as that of frame Pa0 is performed. The motion compensation prediction circuit 120 can perform prediction from both frames Ia0 and Pa0 stored as decoded data in the memory 118. After the completion of coding of frame Ba0, the motion detection circuit 121 obtains the total sum of the absolute values of motion vectors supplied from the motion compensation prediction circuit 120 and supplies the total sum as frame motion information to the CPU 122. The multiplexing circuit 109 multiplexes on the variable-length-coded data train of frame Ba0 the motion vectors from the motion compensation prediction circuit 120 and the motion information from the CPU 122.

Frame Ba1 is processed in the same manner as frame Ba0, followed by processing of frame Pa1. In processing of frame Pa1, however, the motion compensation prediction circuit 120 performs prediction from the decoded data on frame Pa0 to obtain motion vectors and supplies the motion vectors to the motion detection circuit 121 and to the multiplexing circuit 109. After the completion of coding of frame Pa1 of image data, the motion detection circuit 121 obtains the total sum of the absolute values of the motion vectors supplied from the motion compensation prediction circuit 120 and supplies the obtained total sum as frame motion information to the CPU 122. The multiplexing circuit 109 multiplexes on the variable-length-coded data train of frame Pa0 the motion vectors from the motion compensation prediction circuit 120 and the motion information from the CPU 122.

The multiplexing circuit 109 supplies an error correcting circuit 110 with multiplexed data in which the motion vectors, the motion information and the coded image data are multiplexed as described above. The error correcting circuit 110 processes the data output from the multiplexing circuit 109 by error correcting coding suitable for a magneto-optical disc 113 and outputs the processed data to a buffer 111. The buffer 111 buffers recording data according to the amount of information in the recording data and outputs the buffered data to a recording circuit 112. The recording circuit 112 is constituted of a well-known light beam irradiation section, a drive section for driving a magnetic head and the disc 113, etc., and records the data output from the buffer 111 on the magneto-optical disc 113.

Thereafter, frames Ba2 and Ba3 are successively processed in this order and recorded on the disc 113.

A reproducing system 200 will now be described with reference to FIG. 2.

The operation at the time of normal reproduction will first be described.

Referring to FIG. 2, the operation switch 123 has a reproduction key for providing an instruction to perform normal reproduction and a search reproduction key for providing an instruction to perform search reproduction described below. When the CPU 122 receives the normal reproduction instruction by the operation switch 123, it outputs a control signal to a reproducing circuit 201.

The reproducing circuit 201 has the light beam irradiation section, the drive section, etc., used in the recording circuit 112 shown in FIG. 1. The reproducing circuit 201 reproduces, at a normal reproduction speed, data recorded on the magneto-optical disc 113, and outputs the reproduced data to a buffer 202. The buffer 202 buffers the reproduced data according to the data rate of the reproduced data from the magneto-optical disc 113 and outputs the buffered data to an error correcting circuit 203.

The error correcting circuit 203 corrects errors in the reproduced data according to error correcting coding at the time of recording and outputs the error-corrected reproduced data to a decoding circuit 204 and to the CPU 122. The decoding circuit 204 decodes the reproduced image data and outputs the decoded data to a memory 205.

Figure 4:
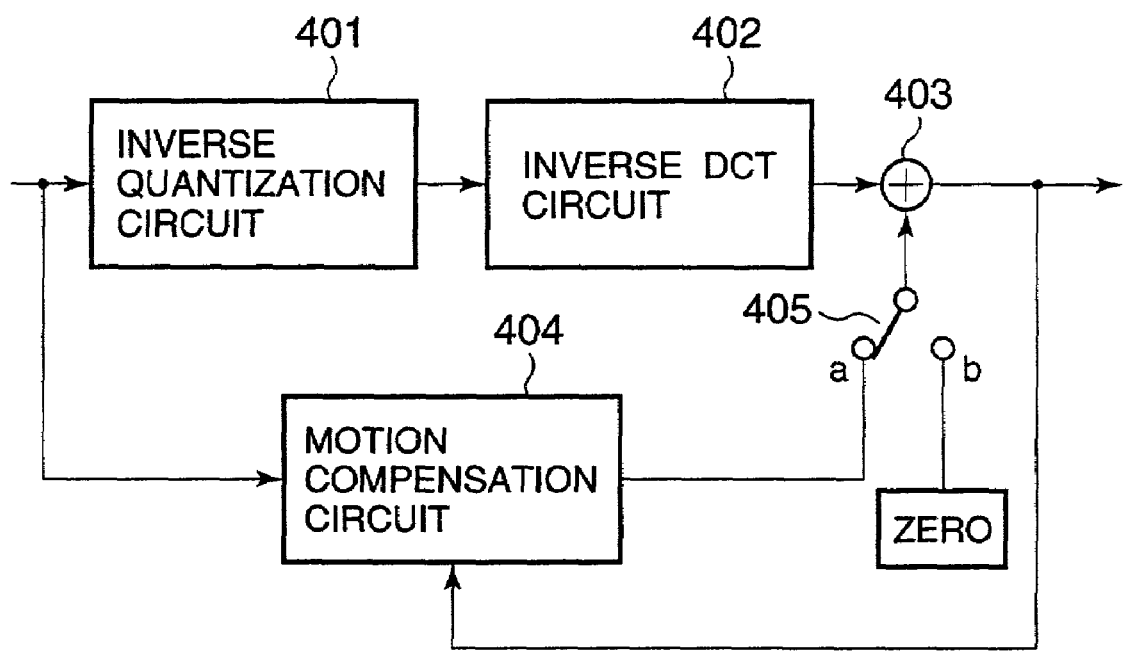
FIG. 4 is a diagram showing the configuration of a coding circuit in the system shown in FIG. 2.

FIG. 4 is a diagram showing the configuration of the decoding circuit 204.

Referring to FIG. 4, reproduced data from the error correcting circuit 203 is output to an inverse quantization circuit 401 and to a motion compensation circuit 404. The inverse quantization circuit 401 inverse-quantizes the reproduced data and outputs the inverse-quantized data to an inverse DCT circuit 402. The inverse DCT circuit 402 processes the data from the inverse quantization circuit 401 by inverse DCT processing and outputs the processed data to an adder 403.

The adder 403 adds together data output from a switch 405 and the data output from the inverse DCT circuit 402 and outputs the addition result to the memory 205 and to the motion compensation circuit 404. The switch 405 establishes a connection through a terminal b to select zero data when the reproduced data is an I-picture, and establishes a connection through a terminal a to select the data output from the motion compensation circuit 404 when the reproduced data is a P- or B-picture.

The motion compensation circuit 404 detects the picture type of the reproduced image data on the basis of the reproduced data from the error correcting circuit 203 and stores in an internal memory the data output from the adder 403 when the reproduced data is an I- or P-picture. The motion compensation circuit 404 reads out the image data stored in the internal memory on the basis of the motion vectors of each block in the reproduced data, and outputs the read image data to the switch 405.

The image data thus decoded by the decoding circuit 204 is stored in the memory 205. When the data is output from the memory 205, the order thereof is changed.

That is, at the time of normal reproduction, the CPU 122 rearranges, in the order shown by reference numeral 301 in FIG. 3, the reproduced data decoded in the order indicated by reference numeral 302 in FIG. 3 and stored in the memory 205, and outputs the rearranged data. Thus, the order of reproduced image data is changed by using the memory 205 and, accordingly, the memory 205 is capable of storing several frames (ten frames in this embodiment) of decoded image data.

The image data read out from the memory 205 is output to a buffer 207. A buffer control circuit 209 reads out the image data stored in the buffer 207 at a suitable timing according to an instruction from the CPU 122 and outputs the read image data to an output circuit 208. Before outputting the image data from the buffer 207, the output circuit 208 processes the image data according to an external device to which the data is to be output.

The operation at the time of search reproduction of the apparatus shown in FIG. 2 will next be described.

The recording and reproducing apparatus of this embodiment is capable of reproducing recorded data from the disc 113 at a rate several times higher than the rate at which the data has been recorded on the disc 113 by the recording system 100. Accordingly, recording in this embodiment is performed in such a manner that data is intermittently recorded on the magneto-optical disc 113 each time a predetermined amount of data is stored in the buffer memory 111, and the data is intermittently read out from the disc 113 by the predetermined amount in the normal reproduction mode. At the time of search reproduction, the data is continuously read out from the magneto-optical disc 113. In this manner, the data is reproduced at a rate several times higher than the rate in the normal reproduction mode.

That is, referring to FIG. 2, when the search reproduction key of the operation switch 123 is operated for instruction to perform the operation in the search reproduction mode, the CPU 122 controls the reproducing circuit 201 to reproduce data at a speed several times higher, five times higher in this embodiment than the speed in the normal reproduction mode, and to output the reproduced data to the error correcting circuit 203 via the buffer 202. The reproducing system 200 is capable of processing reproduced data at a speed five times higher than the speed in the normal reproduction mode, and the decoding circuit 204 decodes all the data reproduced at the speed five times higher than the speed in the normal reproduction mode and outputs the decoded data to the memory 205.

Here, the concept on which processing of output data at the time of quintuple-speed search reproduction in this embodiment is based will be described with reference to FIG. 5.

Quintuple-speed search reproduction may be achieved by outputting five frames of image data during the time period corresponding to one frame. In this embodiment, therefore, all the data recorded at a speed five times higher than the normal reproduction speed are reproduced and decoded at the time of search reproduction. FIG. 5 shows a state of reproduced image data and a displayed image. In FIG. 5, each of sections 501, 502, and 503 includes a group of successive five frames of image data, and the combination of these groups of frames 501, 502, and 503, that is, 15 frames of image data form GOP1.

Figure 5:
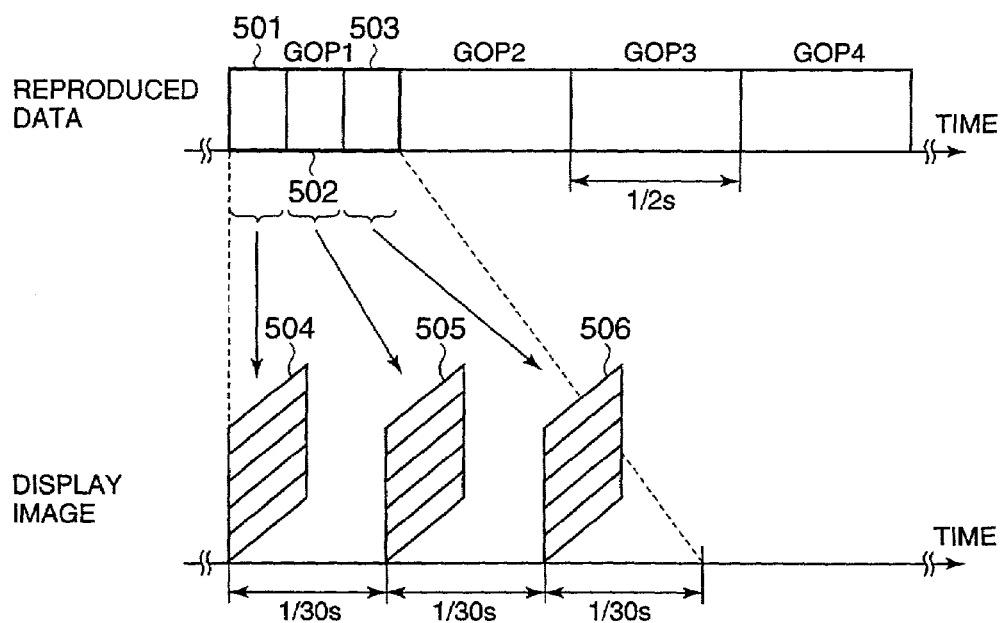
FIG. 5 is a diagram for explaining the operation at the time of search reproduction in an embodiment of the present invention.

As shown in FIG. 5, the group of successive five frames of image 501 in the 15 frames of image data in one reproduced GOP is used to form one frame of image data 504, the group of successive five frames of image 502 is used to form one frame of image data 505, and the group of successive five frames of image 503 is used to form one frame of image data 506.

The area of each frame of image data is divided into five regions, and five divided regions of the five frames at different positions are used to form one frame of image data.

Figure 6:
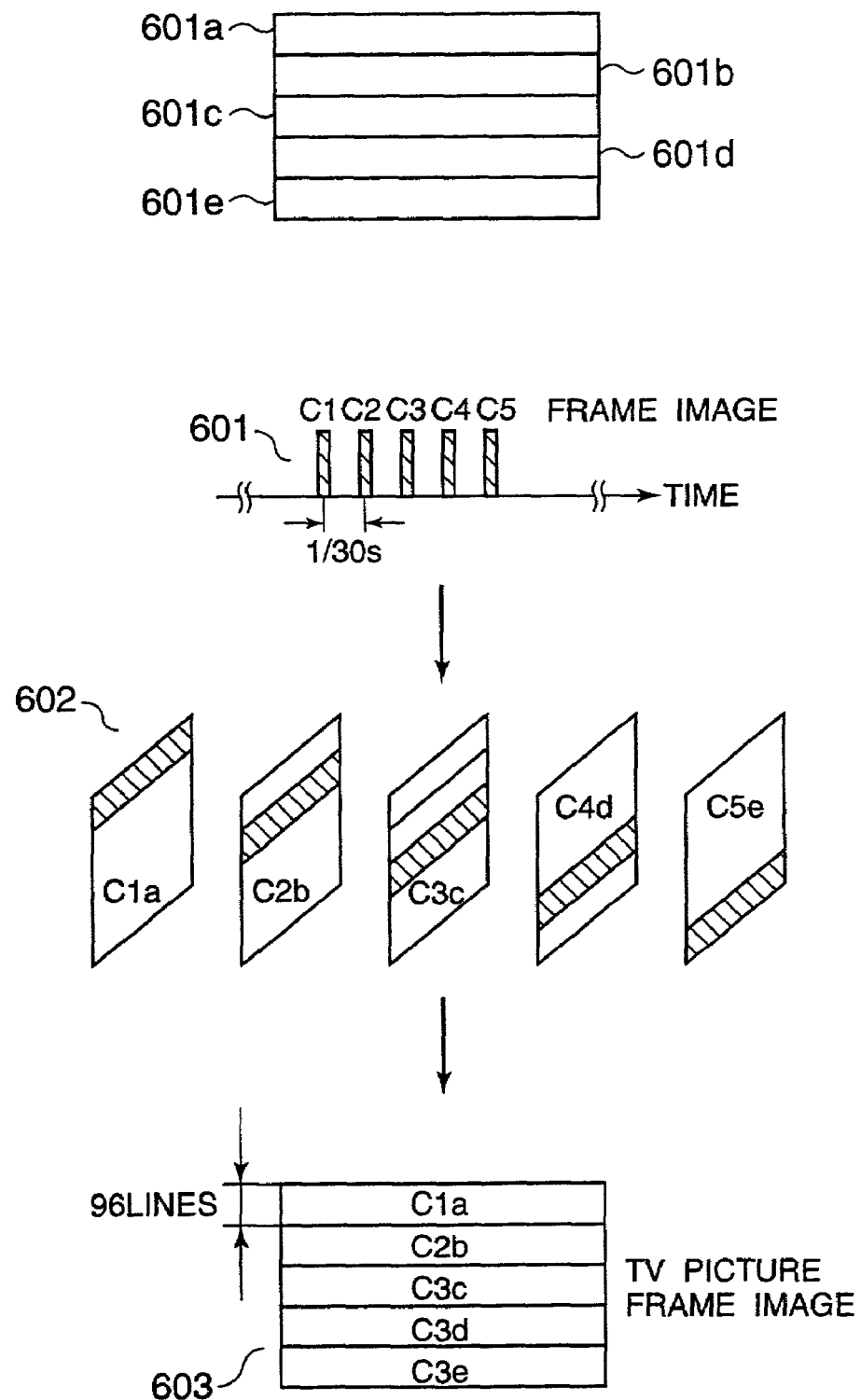
FIG. 6 is a diagram showing a reproduced image at the time of search reproduction in the embodiment of the present invention.

FIG. 6 shows the process of forming one frame of image data from successive five frames of image data.

As shown in FIG. 6, image data of each of successive five frames C1, C2, C3, C4, and C5 indicated at 601 is divided into five regions 601a, 601b, 601c, 601d, and 602e. One of the five divided regions of each frame is extracted as shown at reference numeral 602, and image data units corresponding to the extracted regions of the five frames are combined to form one image frame as shown at reference numeral 603.

That is, a region C1a corresponding to 1st to 96th lines from the top is extracted from frame C1, a region C2b corresponding to 97th to 192nd lines from frame C2, a region C3c corresponding to 193rd to 288th lines from frame C3, a region C4d corresponding to 289th to 384th lines from frame C4, and a region C5e from 385th to 480th lines from frame C5, and these regions are placed in this order from the top, as shown at reference numeral 603.

Thus, a plurality of successive frames of image data are each divided into a plurality of regions, and the parts of the regions of each frame are combined to form one frame of image data for images to be searched. As a result, each of the frame images output at the time of search reproduction can change smoothly.

Specifically, referring to FIG. 2, the CPU 122 reads out image data on one of divided five regions of each of five frames of image data appearing successively as shown in FIGS. 5 and 6 in a plurality of frames of reproduced image data stored in the memory 205, and outputs the read image data to the buffer 207. Then the CPU 122 controls the buffer control circuit 209 to determine an address in the buffer 207 at which image data on each region read out from the memory 205 is stored, such that one frame of image data is formed as shown at 603 in FIG. 6. The buffer control circuit 209 reads out the thus-formed frames of image data to be searched one by one at intervals of 1/30 sec, and supplies each frame to the output circuit 208.

Thus, at the time of quintuple-speed search reproduction in this embodiment, all the data are reproduced from the disc at a speed five times higher than the normal reproduction speed, and portions of five successive frames of image data reproduced at the quintuple speed divided into a plurality of regions are combined to form one frame of image data to be searched, thereby enabling even images reproduced during search reproduction to be obtained as smoothly moving images.

Consequently, the present invention realizes search reproduction ensuring improved visibility in comparison with the conventional method of updating displayed images on a frame basis.

A second embodiment of the present invention will now be described.

The configuration of the recording and reproducing apparatus in this embodiment is the same as that shown in FIGS. 1 and 2. In this embodiment, a search is performed by using motion information with respect to frames, which is formed by the motion detection circuit 121 shown in FIG. 1 and recorded together with image data.

The search reproduction operation in this embodiment will be described with reference to the flowchart of FIG. 7.

Referring to FIG. 7, when the operation switch 123 is operated to input an instruction to start search reproduction, the CPU 122 performs quintuple-speed read-out by controlling the reproducing circuit 201 as described above to reproduce data from the disc 113 at a speed five times higher than the normal reproduction speed (S701). The CPU 122 then detects, from the reproduced data from the error correcting circuit 203, motion information with respect to frames added at the time of recording to determine whether there is a movement. In this embodiment, the existence of a movement is recognized if one GOP contains eight or more frames to which motion information indicating the existence of a movement has been added (S702).

If the existence of a movement is recognized as in the above-mentioned embodiment, successive five frames of image data stored in the memory 205 is divided into a plurality of regions, a region to be displayed is selected from each frame (S703), and the selected region of the data is output to the buffer 207 (S704).

On the other hand, if it is determined in step S702 that there is no movement, a search-object image formed by the above-described synthesis processing is output from the image data on the present GOP but only the leading I-picture is selected and output to the buffer 207 with respect to the next GOP (S706). Then the buffer control circuit 209 is controlled so as to continuously output this leading I-picture for the 3-frame period. This process is repeated until an instruction to stop search reproduction is given (S705).

Thus, in this embodiment, only an I-pictures is output when a reproduced image does not move largely. Therefore, an image higher in resolution than an image formed by combining portions of five frames of image data as shown in FIG. 6 can be output. In this case, an image formed of the same I-picture is output for the period corresponding to one GOP in reproduced data, i.e., the 3-frame period during quintuple-speed search reproduction. However, since the original recorded image has only a small movement, the output image is generally satisfactory in terms of naturalness.

Since portions of five successive frames of image data are combined to form a search-object image if the extent of movement is large, a smoothly moving search-object image can be obtained.

The embodiments of the present invention have been described with respect to case where, in consideration of reproducible data rate, memory capacity or the like, the reproduction speed during search reproduction is set to a speed five times higher than the normal reproduction speed. However, the ability of the recording and reproducing system and the memory capacity may be changed as desired to perform search reproduction at a speed other than the above-mentioned speed.

For example, in a case where tenfold-speed reproduction is performed, the arrangement may be such that data is reproduced from disc 113 at a speed ten times higher than the normal reproduction speed, each of successive ten frames stored in the memory is divided into ten regions, and respective portions of the ten frames of reproduced image data are combined to form one frame of image data for tenfold-speed search, as shown in FIG. 6.

That is, to perform n-fold-speed reproduction, each of n frames of image data successively reproduced is divided into n regions, and one region is extracted from each frame to form one frame. In this manner, images can be reproduced to be searched with the same facility.

While the embodiments of the present invention have been described with respect to an apparatus which compresses, encodes and record image data on the basis of an MPEG system, the present invention can be advantageously applied to recording and production of image data on a disk medium on the basis of other systems to achieve similar effects.

Many widely different embodiments of the present invention may be constructed without departing from the spirit and scope of the present invention. It should be understood that the present invention is not limited to the specific embodiments described in the specification, except as defined in the appended claims.

What is claimed is:

1. A reproducing apparatus comprising:
    reproducing means for reproducing image data from a recording medium, said reproducing means reproducing the image data at a speed higher than a normal reproduction speed in a high-speed reproduction mode;
    storage means for storing a plurality of pictures of image data reproduced by said reproducing means; and
    forming means for dividing each of a plurality of pictures of image data stored in said storage means into a predetermined number of regions corresponding to the speed at which the image data is reproduced in said high-speed reproduction mode, and for forming one picture of high-speed-reproduction image data by using the different divided regions of the plurality of pictures of image data.

2. An apparatus according to claim 1, wherein said forming means divides each of a plurality of successive pictures of image data stored in said storage means into a plurality of regions, and forms one picture of high-speed-reproduction image data by using one of divided regions of each of the plurality of pictures of image data, said one divided region of each picture differing in position from each other.

3. An apparatus according to claim 1, wherein said forming means divides each of n pictures (n: an integer equal to or greater than 2) of image data stored in said storage means into a plurality of regions, and forms one frame of high-speed-reproduction image data by using one of n divided regions of each of the plurality of pictures of image data, said one divided region of each picture differing in position from each other.

4. An apparatus according to claim 3, wherein said forming means forms one picture of the high-speed-reproduction image data for every nth picture of image data reproduced by said reproducing means.

5. An apparatus according to claim 3, wherein the number n is determined according to the speed at which the image data is reproduced by said reproducing means.

6. An apparatus according to claim 1, wherein the image data is encoded by interpicture coding and by intrapicture coding.

7. An apparatus according to claim 6, wherein said reproducing means has decoding means for decoding the reproduced image data, and said storage means stores image data decoded by said decoding means.

8. An apparatus according to claim 1, wherein the recording medium comprises a disc-like recording medium.

9. A reproducing apparatus comprising:
    reproducing means for reproducing image data from a recording medium, said reproducing means being arranged to reproduce the image data at different reproduction speeds;
    storage means for storing a plurality of pictures of image data reproduced by said reproducing means; and
    forming means for forming normal-reproduction image data and search-reproduction image data by using the plurality of pictures of image data stored in said storage means, said forming means forming one picture of the normal-reproduction image data by using only one picture of image data in the plurality of pictures of image data stored in said storage means, said forming means dividing each of a plurality of pictures of image data stored in said storage means into a predetermined number of regions corresponding to higher one of the different reproduction speed at which the image data is reproduced, and for forming one picture of the search-reproduction image data by using the different divided regions of the plurality of pictures of image data; and
    mode change means for changing the reproduction mode between a normal reproduction mode in which said reproducing means reproduces the image data at a normal reproduction speed and said forming means forms the normal-reproduction image data, and a search reproduction mode in which said reproducing means reproduces the image data at a speed higher than the normal reproduction speed and said forming means forms the search-reproduction image data.

10. An apparatus according to claim 9, wherein said forming means divides each of a plurality of successive pictures of image data stored in said storage means into a plurality of regions, and forms one picture of search-reproduction image data by using one of divided regions of each of the plurality of pictures of image data, said one divided region of each picture differing in position from each other.

11. An apparatus according to claim 9, wherein said forming means divides each of n pictures (n: an integer equal to or greater than 2) of image data stored in said storage means into a plurality of regions, and forms one frame of search-reproduction image data by using one of n divided regions of each of the plurality of pictures of image data, said one divided region differing of each picture in position from each other.

12. An apparatus according to claim 11, wherein said forming means forms one picture of the search-reproduction image data for every nth picture of image data reproduced at a speed higher than the normal-reproduction speed.

13. An apparatus according to claim 11, wherein the number n is determined according to the speed at which the image data is reproduced in the search reproduction mode.

14. An apparatus according to claim 9, wherein the image data is encoded by interpicture coding and by intrapicture coding.

15. An apparatus according to claim 14, wherein said reproducing means has decoding means for decoding the reproduced image data, and said storage means stores image data decoded by said decoding means.

16. An apparatus according to claim 9, wherein the recording medium comprises a disc-like recording medium.

17. A reproducing apparatus comprising:
reproducing means for reproducing image data from a recording medium;
storage means for storing a plurality of pictures of image data in the image data reproduced by said reproducing means;
mode change means for changing the reproduction mode between a first reproduction mode and a second reproduction mode according to motion of an image relating to the image data reproduced by said reproducing means; and
forming means for forming first image data and second image data by using the plurality of pictures of image data stored in said storage means, said forming means dividing each of a plurality of pictures of image data stored in said storage means into a plurality of regions, said forming means forming one picture of the first image data by using the different divided regions of the plurality of pictures of image data, said forming means forming one picture of the second image data by using only one picture of image data of the plurality of pictures of image data stored in said storage means, said forming means firming the first image data in the first reproduction mode and forming the second image data in the second reproduction mode,
wherein said reproducing means also reproduces motion information indicating a movement of an image relating to the image data recorded on the recording medium, and said mode change means changes the reproduction mode according to the motion information reproduced by said reproducing means.

18. An apparatus according to claim 17, wherein the image data reproduced by said reproducing means is encoded by interpicture coding and by intrapicture coding, and said reproducing means has decoding means for decoding the image data reproduced from the recording medium.

19. An apparatus according to claim 18, wherein said storage means stores the image data decoded by said decoding means, and said forming means forms, in the second mode, one picture of the first image data by using only decoded image data of the image data encoded by intrapicture coding.

20. A reproducing apparatus comprising:
reproducing means for reproducing image data from a disc-like recording medium; and
forming means for dividing each of a plurality of pictures of image data reproduced by said reproducing means in a search reproduction mode in which said reproducing means reproduces the image data at a speed higher than a normal reproduction speed into a predetermined number of regions corresponding to the speed at which the image data is reproduced in said search reproduction mode, and for forming one picture of search-reproduction image data by using the different divided regions of the plurality of pictures of image data.

21. An apparatus according to claim 20, wherein the image data recorded on the disc-like recording medium is encoded by interpicture coding and by intrapicture coding, and said forming means forms, in the search reproduction mode, one picture of the search-reproduction image data by using portions of the plurality of successive pictures of image data including image data decoded from the intrapicture-coded image data and image data decoded from the interpicture-coded image data in the image data reproduced by said reproducing means.

22. A method for reproducing image data from a recording medium, said method comprising the steps of:
storing in a memory a plurality of pictures of image data reproduced from the recording medium at a speed higher than a normal reproduction speed in a high-speed reproduction mode; and
dividing each of the plurality of pictures of image data stored in the memory into a predetermined number of regions corresponding to the speed at which the image data is reproduced in said high-speed reproduction mode, and for forming one picture of image data by using the different divided regions of the plurality of pictures of image data.

23. A reproduction method comprising the steps of:
reproducing image data from a disc-like recording medium; and
dividing each of a plurality of pictures of image data reproduced by said reproducing means in a search reproduction mode in which said reproducing means reproduces the image data at a speed higher than a normal reproduction speed into a predetermined number of regions corresponding to the speed at which the image data is reproduced in said search reproduction mode, and forming one picture of search-reproduction image data by using the different divided regions of the plurality of pictures of image data.

* * * * *